Feb. 21, 1950 J. R. O'BRIEN 2,498,219
PLURAL VALVE PLUMBING FIXTURE
Filed Sept. 24, 1945
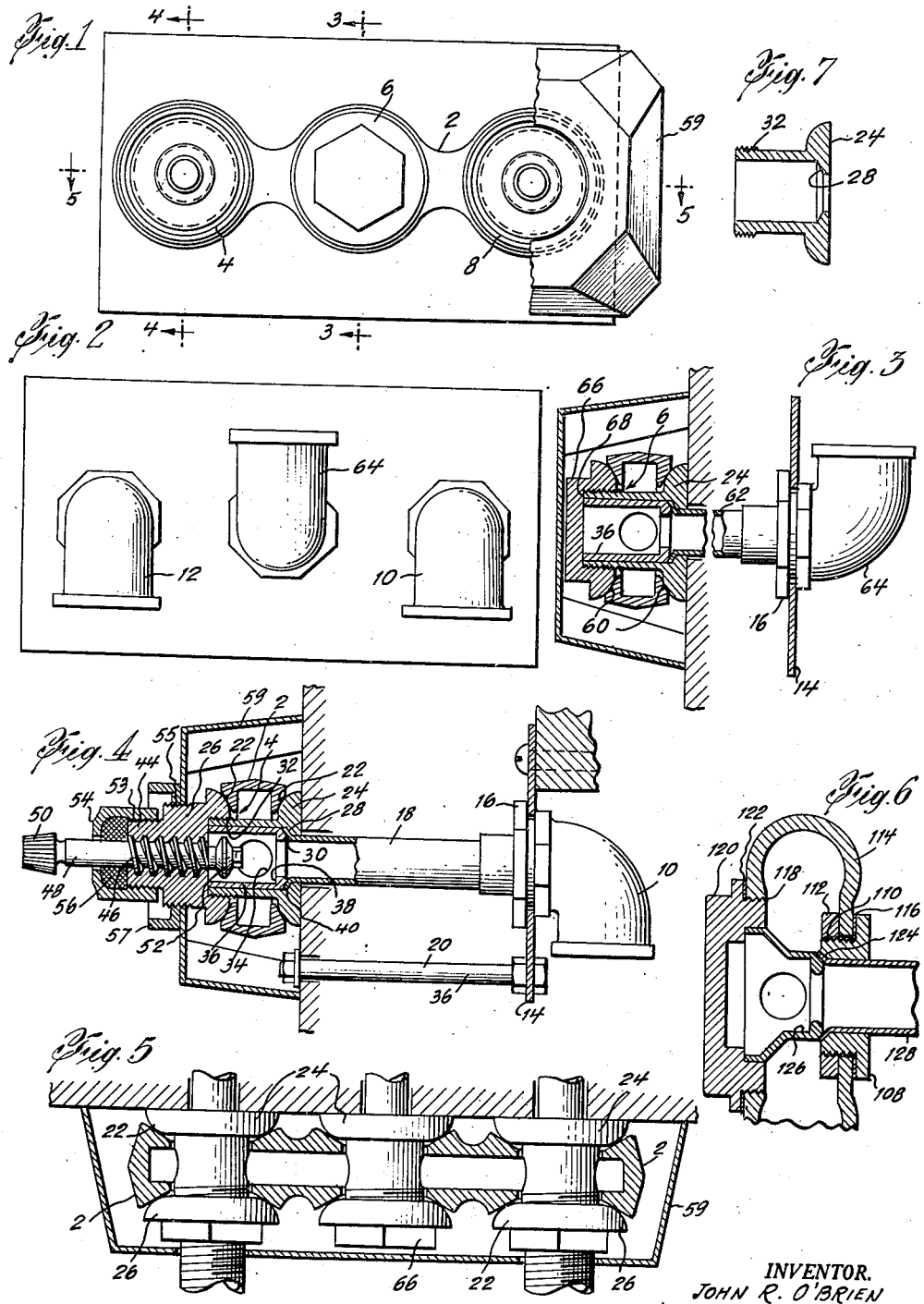
INVENTOR.
JOHN R. O'BRIEN
BY
George L. Wade
ATTORNEY Patented Feb. 21, 1950

2,498,219

UNITED STATES PATENT OFFICE 2,498,219

PLURAL VALVE PLUMBING FIXTURE

John R. O'Brien, West Hempstead, N. Y.

Application September 24, 1945, Serial No. 618,205

5 Claims. (Cl. 277—57)

This invention has to do with an improvement in plumbing fixtures in which a plurality of valves control the flow of water to other plumbing fixtures and more specifically to an improved means for attaching the external wall fixtures to the connections running through the wall and in which all parts may be readily removed for repair without the necessity of removing the entire distributing head.

The principal object of the invention is the provision of such an improved plumbing fixture in which any of the parts may be removed for repair such as any valve together with its valve seat without the necessity of removing the entire distributing head and in which only the hot or cold water need be cut off for such repair.

An object of the present invention is the provision of means for attaching the various control valves to the usual piping running through the wall in such manner that they will be readily accessible on the exterior of the usual tiled or other surfaced wall to permit of necessary repairs without the necessity of breaking the wall surface.

A further object of the present invention is the provision of such a fixture which may be easily and rapidly coupled to plurality of pipes or the like and conveniently positioned at varying distances from the usual template secured at the rear of the wall to accommodate variations in wall thickness.

A still further object of the present invention is the provision of such coupling means that will be inexpensive to manufacture, efficient in use and readily installed.

In the accompanying drawings forming a part of this specification:

Figure 1 is a face view of this improved plural valve plumbing fixture installed in a wall structure providing for hot and cold water connections to a shower and illustrating such fixture with the cover plate partly removed;

Fig. 2 is a rear view of the template secured to the opposite side of the wall;

Fig. 3 is a vertical section taken on the line 3—3 of Fig. 1, looking in the direction of the arrows;

Fig. 4 is a vertical section taken on the line 4—4 of Fig. 1 looking in the direction of the arrows;

Fig. 5 is a horizontal section taken on the line 5—5 of Fig. 1 looking in the direction of the arrows;

Fig. 6 is a detail sectional view illustrating a slight modification of one of the water inlet connecting members; and Fig. 7 is a detail side elevation in section of one of the connecting members or pipe fittings.

Similar characters of reference indicate corresponding parts in the several views.

Before explaining in detail the present improvement and mode of operation thereof, it is to be understood that the invention is not limited to the details of construction illustrated in the accompanying drawings, since the invention is capable of other embodiments and only the principle thereof and the best mode, which has been contemplated, of applying that principle, has been set forth.

This improved plumbing fixture comprises a hollow distributing head 2 of any suitable material such as a brass casting and which in the present instance is provided with three transverse openings 4, 6 and 8 through which pipe fittings hereinafter to be described extend.

The usual hot and cold water supply lines not shown lead through the wall to elbows 10 and 12, which in turn are secured to a template 14 by means of suitable lock nuts 16. As is customary this template 14 is fastened in any suitable manner within the wall.

Connected to each of the elbows 10 and 12 and extending through and beyond the outer wall surface is a nipple or connecting tubing 18 as illustrated in Fig. 4 or it may be provided with external threads at each end.

A suitable bolt as 20 may be passed through the template and tightened against the outer wall surface to properly position the template relative to the outer wall if desired.

The aforementioned transverse openings in the distributing head are of sufficient size to accommodate all parts and are formed on either side with concave sealing seats 22 for the reception on the inner side of convex connecting members 24 and on the outer side with concave water inlet sealing nuts 26. Since all parts are the same only one will be described hereinafter and it is to be understood that they are duplicated at each end of the distributing head.

The connecting member, shown detached in section in Fig. 7, is adapted to lie flush against the outside wall and is provided with an internally tapered ridge or groove 28 adapted to receive a co-operating flared or flanged end 30 of the nipple or tubing. This connecting member is also provided with a forwardly projecting externally threaded tubular portion 32 adapted to extend through the transverse opening in the distributing body for the reception of the water inlet sealing nut 26. This connecting member is also provided with the usual transverse openings 34 connecting with the distributing head 2.

A bushing 36 provided with a valve seat 38 and a tapered or snubbed end 40 is located within the tubular extension 32 and is adapted to be forced against the flared end 30 of the nipple to seal it therebetween and the tapered groove 28 by means of a shoulder 42 provided on the sealing nut. This bushing is also provided with suitable orifices (not shown) to permit water flow to the hollow distributing head.

The convex sealing nut 26 is likewise provided with a forwardly extending internally and two stepped externally threaded tubular projections 44. The internal threads are designed for the reception of corresponding external threads 46 provided on a valve stem 48 which stem is provided at its outer end with a suitable tapered milled portion 50 for the reception of the usual operating or valve handle, not shown. At the other end of the valve stem is located the usual valve 52 adapted to seat against the valve seat 38 for cutting off the flow of water therethrough.

The external threads 53 of the sealing nut 26 are provided for the reception of the usual compression nut 54 within which is located suitable packing 56 to prevent leakage around the valve stem, and exterior of this nut 54 adapted to engage the threads 55 is a nut 57 provided for the purpose of holding a cover plate 59 in place. It will be observed that the interior diameter of this nut 57 is such that it may be readily slipped over the nut 54.

Centrally of the distributing head 2 is a third transverse opening similarly provided at either side thereof with concave sealing seats 60 for the reception at one side thereof of a third convex connecting member 24 adapted to connect a similarly flared nipple 62, extending through the template 14 to an elbow 64 which in turn is connected by piping (not shown) to a shower head (likewise not shown).

At the other side of the distributing head a convex sealing nut or plug 66 is provided to close the end of the connecting member 24 and this nut 66 is provided with a shoulder 68 to lock the bushing 36 against the flared end of the nipple 62 in a manner similar to that of the sealing nut 26.

Figure 6 is a section through the distributing head of a modified form in which the tail piece or connecting member 108 is externally threaded as 110 for the reception of a nut 112 adapted to secure the housing or distributing head 114 in position. Suitable packing 116 is placed behind the distributing head to make it leak-proof. In this form the outer face of the housing is provided with a somewhat larger threaded opening 118 for the reception of an enlarged externally threaded sealing plug 120 likewise provided with a washer or packing 122. A shoulder 124 is provided to hold the valve seat or bushing 126 against the flared end of the nipple 128. The enlarged opening 118 is provided to permit access to the nut 112 should it be desired to remove the distributing head for any purposes.

Thus it will be seen that with the exception of that form illustrated in Fig. 6 I have provided an improved plumbing fixture in which the distributing head is entirely devoid of threads and which may be readily and inexpensively made without the necessity of any tappings.

Thus it will be observed that I have provided a simple and improved method of securing the external operating parts of a plural valve fixture to the protruding nipple in such manner that all parts including the valve and valve seat may be readily removed without disturbing the surface wall and without removing the distributing head should any repairs become necessary, while at the same time maintaining all connections outside of the wall where they may be readily tested and checked for any leakages.

While there has been shown, described and pointed out the fundamental novel features of the invention, it is to be understood that various omissions, substitutions and changes may be made by those skilled in the art in the form and details of the device illustrated and in its operation without departing from the spirit of the invention. It is the intention, therefore, to be limited only as indicated by the scope of the following claims.

I claim as my invention:

1. A plural valve plumbing fixture including in combination: A hollow distributing-head having spaced apart laterally extending apertures therethrough, a water passage communicating with its hollow interior and with said apertures, said apertures having connection with a hot and cold water supply and with a water outlet, means connecting all of said water supply means extending through and sealing the apertures against leakage, and valve means located within the hot and cold water supply connecting means for controlling the flow of water to said water outlet, said valve means including a removable valve seat having a tapered end adapted to cooperate with an outwardly flared end provided on the hot and cold water supply.

2. A plural valve plumbing fixture including in combination: A hollow distributing-head having spaced apart laterally extending apertures therethrough, a water passage communicating with its hollow interior and with said apertures, means connecting each of said apertures with a hot and cold water supply and with a water outlet, said means extending through said apertures and adapted to seal one side of said head against leakage, means connected to said connecting means and adapted to seal the other side of said head against leakage and means located within the hot and cold water connecting means and within said apertures for controlling the water flow to said water outlet, said last means including a removable valve seat having a tapered end adapted to cooperate with an outwardly flared end provided on the hot and cold water supply.

3. A plural valve plumbing fixture including in combination: A hollow distributing-head having spaced apart laterally extending apertures therethrough, a water passage communicating with its hollow interior and with said apertures, each of said apertures provided with a concave sealing seat at each side thereof, connecting members connected with a hot and cold water supply and with a water outlet, each of said connecting members having a convex surface cooperating with the concave sealing seat on one side of said head and a forwardly extending tubular portion extending through said apertures; a convex sealing nut connected with each connecting member and cooperating with the sealing seat on the other side of said head, a removable valve seat located within the connecting members for the hot and cold water supply provided with a tapered end adapted to cooperate with an outwardly flared end provided on the hot and cold water supply, and a valve therein for controlling the water flow to the outlet.

4. A plural valve plumbing fixture including in combination: A hollow distributing-head having spaced apart laterally extending apertures therethrough, a water passage communicating with its hollow interior and with said apertures, each of said apertures provided with a concave sealing seat at each side thereof, connecting members connected with a hot and cold water supply and with a water outlet, each of said connecting members having a convex surface cooperating with the concave sealing seat on one side of said head and a forwardly extending tubular portion extending through said apertures; a convex sealing nut connected with each connecting member and cooperating with the sealing seat on the other side of said head, a removable valve seat located within the connecting members for the hot and cold water supply and a valve therein for controlling the water flow to the outlet, said connecting member and valve seat having cooperating surfaces for clamping an outwardly flared end of the supply lines therebetween.

5. A plural valve plumbing fixture including in combination: A hollow distributing-head having spaced apart laterally extending apertures therethrough, a water passage communicating with its hollow interior and with said apertures, each of said apertures provided with a concave sealing seat at each side thereof, connecting members connected with a hot and cold water supply and with a water outlet, each of said connecting members having a convex surface cooperating with the concave sealing seat on one side of said head and a forwardly extending tubular portion extending through said apertures; a convex sealing nut connected with each connecting member and cooperating with the sealing seat on the other side of said head, a removable valve seat located within the connecting members for the hot and cold water supply and a valve therein for controlling the water flow to the outlet, said connecting member and valve seat having cooperating surfaces for clamping an outwardly flared end of the supply lines therebetween, said sealing nut having a shoulder for forcing the cooperating surfaces of the valve seat and connecting member together.

JOHN R. O'BRIEN.

REFERENCES CITED

The following references are of record in the file of this patent:

UNITED STATES PATENTS

| Number | Name | Date |
| --- | --- | --- |
| 1,878,097 | Bletcher | Sept. 20, 1932 |
| 2,138,503 | O'Brien | Nov. 29, 1938 |
| 2,231,276 | McGarry | Feb. 11, 1941 |